Feb. 19, 1935.  D. R. DAVIES  1,992,024
ELECTRICAL SWITCH GEAR
Filed Feb. 28, 1933  4 Sheets-Sheet 1

Inventor:
David R. Davies,
by *Charles W. Tullar*
His Attorney.

Patented Feb. 19, 1935

1,992,024

UNITED STATES PATENT OFFICE 1,992,024

ELECTRICAL SWITCH GEAR

David Reginald Davies, Didsbury, England, assignor to General Electric Company, a corporation of New York Application February 28, 1933, Serial No. 658,998
In Great Britain March 10, 1932

7 Claims. (Cl. 175—298)

This invention relates to electrical switch-gear, more particularly to electrical switchgear of the type including a busbar, a terminal connection for a conductor such as a cable end, and a circuit breaker, as an oil circuit breaker, for connecting the bus to said terminal connection.

Such switchgear usually also comprises means for isolating the circuit breaker completely from the circuit including the aforesaid conductors, as for example arrangements permitting the complete removal of the circuit breaker horizontally or vertically from the other parts of the switchgear structure, in which arrangements isolating or disconnecting contacts of the plug and socket type are usually employed. Alternatively, the circuit breaker may be fixed with respect to the remainder of the switchgear structure and mechanically operable isolating switches may be used. The invention specifically relates to metal clad switchgear, namely, switchgear of which the apparatus and conductors are enclosed in grounded or earthed metal chambers, compartments or casings which are filled with an insulating medium as oil or a solid insulating compound.

A principal object of the present invention is the provision of an improved form of metal clad switchgear which is relatively compact in design, simple and efficient in operation and construction, and inexpensive.

In accordance with the present invention the oil circuit breaker is preferably of the vertical single-break type wherein the fixed contact structure is located in or at the base of the circuit breaker tank or casing and its associated vertically alined terminal is led out of the casing at or near said base, the other terminal associated with the moving contact being led out of the casing at a more elevated part of the latter as through the side thereof. It shall be understood that the term "single-break" is used to designate the break or breaks formed at a definite place in the circuit by relative movement of the contact structure as contrasted with the conventional double-break oil circuit breaker wherein a bridging contact is adapted to form two horizontally alined breaks at appreciably spaced points in the circuit.

This invention will be more fully set forth in the following description referring to the accompanying drawing, and the features of novelty which characterize this invention will be pointed out with particularity in the claims annexed to and forming a part of this specification.

Figure 1:
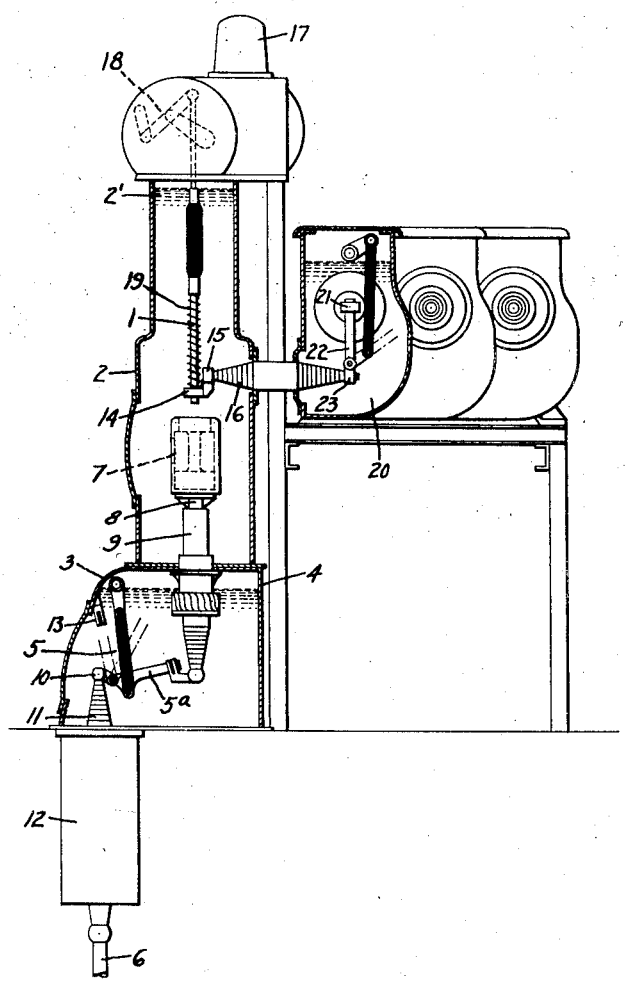
Figure 2:
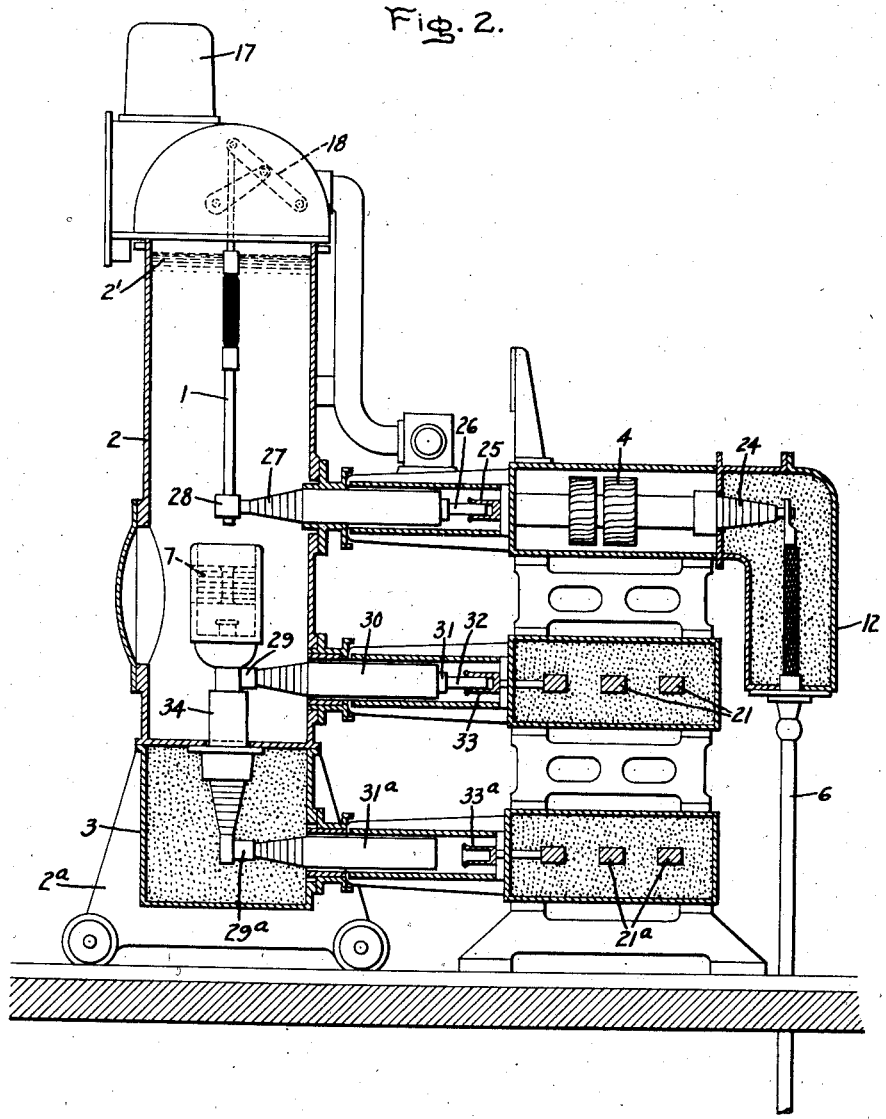
Figure 3:
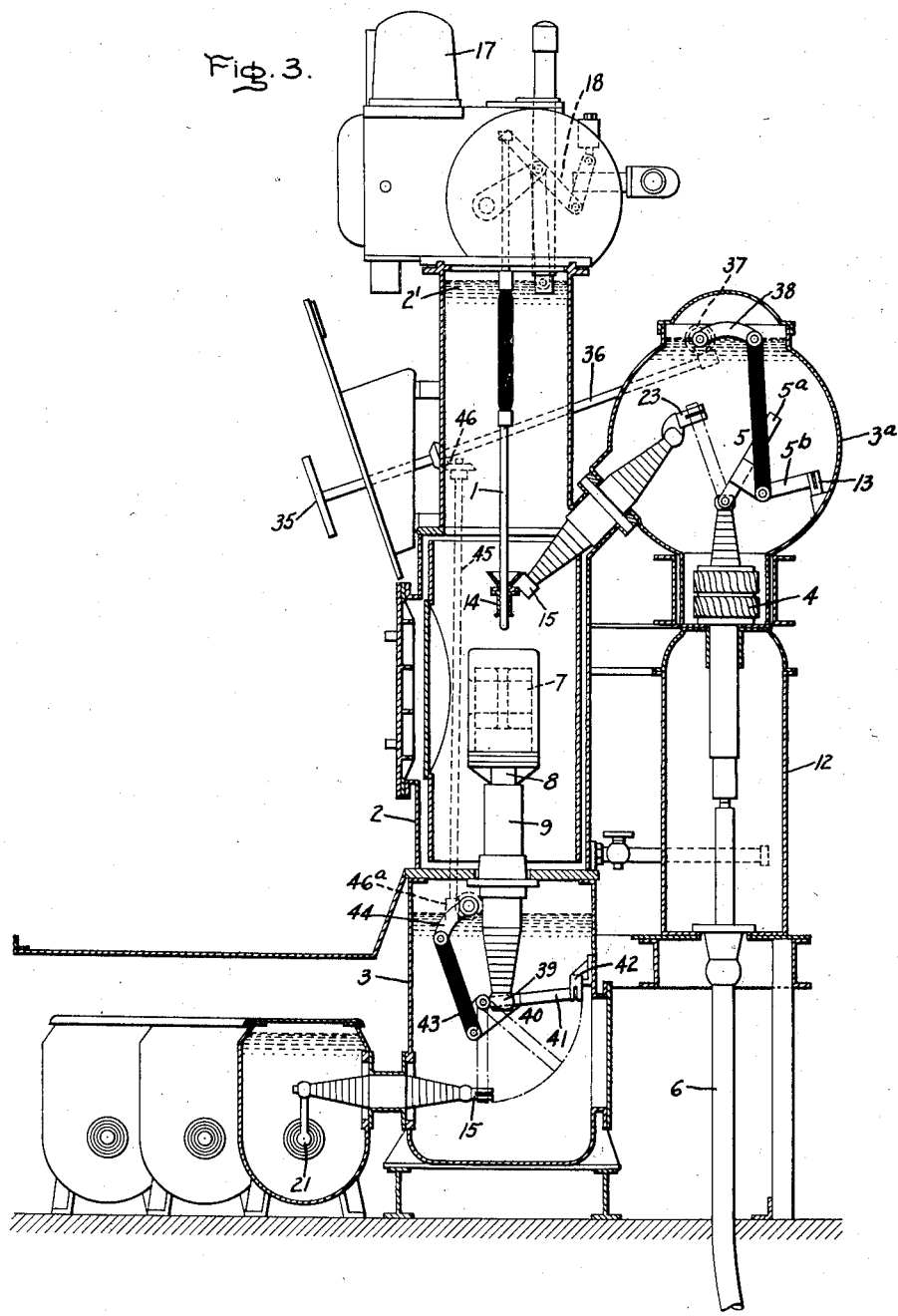
Figure 4:
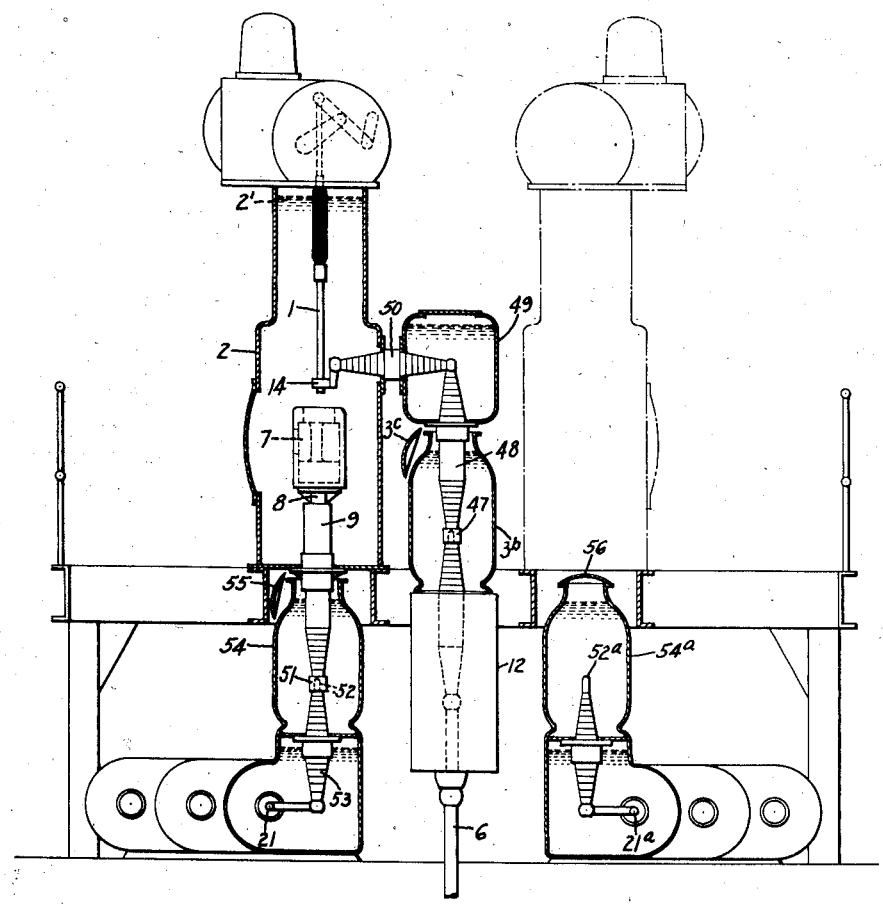

Referring to the drawings, Fig. 1 is an elevational view, partly in section, of one phase unit of a high tension, metal clad polyphase bus and switch station embodying the present invention; Fig. 2 is a similar view showing another form of the present invention including one of a set of high voltage, metal clad switches of the horizontal draw-out type having vertical plunger contacts and adapted to connect the terminals of incoming cables to either one or the other of two alternative sets of three-phase busbars; Fig. 3 is an elevational view, partly in section, showing a switchgear arrangement generally similar to that in Fig. 1, and Fig. 4 is an elevational view, partly in section, illustrating a metal clad, oil-filled switch of the draw-out type, having vertical isolation which permits selection between two or more different sets of busbars for a set of cables.

Referring to Fig. 1, the switch or circuit breaker illustrated comprises essentially a vertical plunger contact rod 1 which, together with the coacting fixed contacts 7 and 14, is disposed within a substantially cylindrical tank 2 constituting an explosion pot. The fixed contact structure may of course be of any suitable type, as for example arc extinguishing structure of the oil blast type. The circuit breaker is preferably of the type wherein the fixed contact structure is mounted in the base of the oil tank or chamber, and the coacting moving plug or plunger contact is operable from the top of the oil tank or casing upon which are conveniently mounted the operating and tripping mechanisms of the circuit breaker. The moving contact may be electrically connected with its laterally led-out terminal through sliding engagement alone but preferably a flexible shunt is provided which may comprise copper braiding which is folded zigzag, perforated and threaded upon the plunger. The terminals are preferably led out through insulating bushings of the condenser type.

Preferably the fixed contact of the circuit breaker is directly carried upon a vertical terminal conductor passing in a condenser type bushing through the base of the circuit breaker oil tank or casing and extending into a base chamber which may support the circuit breaker oil tank or casing. The aforesaid base chamber may also contain isolating or disconnecting switches and/or current transformers, said isolating switches connecting the circuit breaker terminals with conductors passing through vertical bushings, also of the condenser type, which extend downwards through the bottom of said base chamber into a cable dividing or sealing box. Such isolating switches may be of the blade type, with each blade pivoted on the incoming conductor and adapted to engage in jaws carried by a circuit breaker terminal.

The tank 2 containing a suitable arc extinguishing or insulating liquid 2', as oil, is mounted on the top of an oil-filled casing forming an insulating chamber 3 which houses a current transformer 4 and an isolating and grounding switch 5, so that the associated incoming cable 6 may be connected to or disconnected from the fixed contact structure 7. The contact 7 is carried directly upon a vertical terminal conductor 8 which passes in a condenser type bushing 9 through the base of the circuit-breaker oil tank 2 and extends into the chamber 3. The cable isolator switch 5 includes a blade 5a which is pivoted on the upper end of a conductor 10 which passes through a vertical bushing 11 of the condenser type, extending downwards through the bottom of the chamber 3 into a cable sealing box 12. It will be apparent that a flexible shunting conductor may be connected across the pivotal connection of the isolator switch where required.

A grounding contact 13 is provided on the inner side of the oil chamber 3 and the blade 5a of the cable isolator switch may be moved into contact therewith to ground the cable.

The moving contact rod 1 passes through and is guided in the contact 14 which is mounted at the end of a conductor 15 passing horizontally out of the tank 2 within a bushing 16 of the condenser type. The conductor 15 terminates at its outer end within an oil-filled casing 20 likewise forming an insulating chamber comprising a combined T-box and busbar insulator, the metal enclosed busbar being indicated at 21. The blade 22 of an isolating switch is pivotally mounted on the terminal 23 of the conductor 15 and enables the busbar 21 to be isolated with respect to the circuit breaker.

For the purpose of actuating the contact rod 1, a solenoid mechanism 17 and operating linkage 18 mounted at the top of the tank 2 are generally indicated. The contact 1 is electrically connected with the lateral terminal 14 through sliding engagement, and additionally through a flexible shunt 19 which may comprise copper braiding folded zigzag, perforated and threaded upon the rod 1. The conducting shunt 19 is, of course, electrically connected at its opposite ends to the rod 1 and conductor 15, respectively, there being sufficient slack to permit free movement of the contact rod with respect to contact 14.

In the case of horizontal draw-out type switchgear with alternate sets of busbars, the circuit breaker terminal for one set of busbars may be taken out horizontally in condenser type bushings through the side of the aforesaid base chamber, and the terminals for the other set of busbars may be taken out horizontally in condenser type bushings through a side wall of the circuit breaker oil tank or casing.

In any arrangement according to the invention, each circuit breaker oil tank or casing is conveniently in the form of a vertical metal cylinder.

In the arrangement shown in Fig. 2, the switchgear is of the horizontal draw-out type including a truck unit 2a and main and auxiliary or alternate sets of busbars 21 and 21a. In this case the incoming cable 6 is taken into the cable sealing box 12, and the terminal therefor is connected to a current transformer 4 through a condenser type bushing 24 which terminates in a socket 25. A protruding plug 26, which passes into the tank 2 through a condenser type bushing 27 and terminates in a fixed contact 28, is adapted to engage the socket 25 in the connected and operative position of the circuit breaker. The moving contact rod 1, shown in the "switch-open" position, passes with sliding contact through the contact 28 and is adapted to engage a fixed contact 7 of suitable construction within the tank 3.

A conductor 29, connected to the fixed contact 7, passes out laterally through the side of the tank 2 in a condenser type bushing 30 and terminates in a socket 31. This socket 31 is adapted to receive a removable plug 32 which, in the racked-in position of the circuit breaker, engages a coacting socket 33 connected to one of the busbars 21. A conductor also passes from the fixed contact 7 through a condenser type bushing 34 to a conductor 29a, which passes laterally out through the side wall of the chamber 3 and is provided with a socket 31a adapted to accommodate the removable plug 32.

This plug, if desired, may be inserted in the socket 31a so as to enter the socket 33a when the switch is racked in, and thus connect the fixed contact 7 to one of the busbars 21a. The switch operating linkage 18 for the contact rod 1, and the closing solenoid 17 are generally indicated at the upper end of the casing 2, and as in the arrangement shown in Fig. 1, a flexible shunt may be provided for the contact rod 1.

In the case wherein the busbar isolation, and if desired also busbar selection, is effected by specially provided switches, the latter are conveniently located in teeing boxes which are preferably oil-filled and into which laterally extend the circuit breaker terminals which are connected with the moving contacts. The busbars extend out horizontally at right angles to said circuit breaker terminals, and in each teeing box sections thereof are adapted to be connected together and with said circuit breaker terminal by the isolating or selector switch. The latter may be in the form of a blade pivoted on the circuit breaker terminal and adapted to engage between the adjacent ends of the outwardly extending busbar sections. The busbars themselves may be enclosed in condenser type insulation.

The arrangement shown in Fig. 3 is an inverted arrangement of that shown in Fig. 1 and the circuit breaker is of the fixed type. In this case the busbar 21 is situated at the lower end of the switchgear beneath an operating platform and the cable sealing chamber 12 is situated above the busbar. The conductor from the incoming cable 6 passes to a current transformer 4 and terminates in a cable isolating switch 5 situated within an oil-filled casing 3a. The blade 5a of the switch is adapted to be connected to the terminal 23 of the conductor 15, or the cable may be grounded through a second blade 5b connected to the blade 5a and coacting with a grounding contact 13 connected to the casing 3a.

The cable isolating switch 5 is adapted to be operated by a detachable handwheel 35 through a shaft 36, a worm gear 37 and a lever 38. As in the arrangement shown in Fig. 1, the vertical moving contact rod 1 passes with sliding contact through the fixed contact 14 to engage the fixed contact 7. The contact 7 is mounted at the upper end of a conductor 8 which passes in a condenser type bushing 9 through the lower end of the oil casing 2 into the oil-filled casing 3, where it terminates at 39.

On the terminal 39 is pivotally mounted a busbar isolating switch 40 whereby the terminal may be connected to the busbar 21 through the blade 41 and the terminal 15. Alternatively, the terminal 39 may be grounded by connection to a grounding terminal 42 connected to the inner side of the casing 3. The isolating switch 40 is operated through the levers 43 and 44, the worm gear 46a, the spindle 45, and the bevel gear 46, from the detachable handwheel 35 which constitutes common actuating means for the isolating switches. The operating linkage 18, the moving contact rod 1 and the closing solenoid 17 are mounted at the upper end of the oil tank 2.

The invention is equally applicable to switchgear wherein circuit breaker isolation is effected by raising it vertically, in which case the lower terminal of the circuit can make vertical plug and socket type of connection with an incoming conductor in the aforesaid base chamber or in an additional chamber or shrouding intermediate said base chamber and the circuit breaker tank or casing, and the upper circuit breaker terminal may be in effect bent over and make vertical plug and socket type connection with a busbar in the busbar chamber or in an intermediate chamber or shrouding. With such arrangement, furthermore, selection of duplicate busbars may be effected by a lateral or rotary movement of the isolated circuit breaker. For example, the two sets of busbars may be disposed one on each side of the circuit breaker so that selection can be effected by rotating the raised circuit breaker through an arc of 180°, the usual safety cover system being employed to prevent access to the contacts of the busbars disconnected from the circuit breaker.

The arrangement illustrated in Fig. 4 shows a switchgear in which the circuit breaker isolation is effected by bodily raising the breaker vertically. In this case the lower terminal 47 of the circuit breaker is adapted to make vertical plug and socket type of connection with the incoming cable 6 which terminates in a vertical plug in the oil-filled base chamber 3b, mounted above the cable sealing box 12. The conductor terminating in the terminal 47 is led through a condenser type bushing 48 through the bottom of an oil-filled casing 49, this conductor passing laterally out of the casing 49 in a condenser type bushing 50 and terminating in a contact 14 through which the moving contact rod 1 passes with sliding contact. The rod 1 cooperates with a fixed contact 7 which is mounted within the oil-filled casing 2. The contact 7 is connected to the upper end of the conductor 8 which passes through a condenser type bushing 9 in the lower end of the tank 2 and terminates in a socket 51. This socket is adapted to engage a vertical plug 52 formed at the upper end of a conductor passing through a condenser type bushing 53 to one of the set of busbars 21.

The structure comprising the tank 2 and the depending socket 51, and also the tank 49 and the depending socket 47 is adapted to be raised vertically and rotated by suitable means (not shown) about the vertical axis passing through the socket 47, to assume the position shown in dotted lines at the right-hand side of Fig. 4. In this latter position the structure may be lowered so that the socket 47 engages the plug within the chamber 3b and the depending socket 51 engages a plug 52a connected to one of an alternative set of busbars 21a. The casing 3b housing the plug 47 and the casings 54 and 54a housing, respectively, the plugs 52 and 52a are provided with safety covers 3c, 55 and 56, respectively, to prevent access to the cable end contact, and the busbar which is disconnected from the circuit breaker when the particular connection is not in use.

It should be understood that this invention is not limited to specific details of construction and arrangement thereof herein illustrated, and that changes and modifications may occur to one skilled in the art without departing from the spirit of this invention.

What I claim as new and desire to secure by Letters Patent of the United States, is,—

1. A high tension, metal clad bus and switch station comprising a single-break circuit breaker having a metallic casing containing an arc extinguishing liquid, a fixed contact disposed at the lower part of said casing, a terminal connection for said contact led through said casing adjacent the base thereof, a vertically movable coacting rod contact, an associated terminal connection, metal enclosed busbar and cable conductors included in a circuit controlled by said circuit breaker, metal enclosures between said casing and said busbar and cable conductors respectively and disconnecting contacts associated with said terminals and metal enclosed conductors disposed within said metal enclosures for connecting and isolating said circuit breaker with respect thereto, said circuit breaker casing being mounted above one of said metal enclosures.

2. A high tension, metal clad bus and switch station comprising a single-break oil circuit breaker having a substantially cylindrical casing vertically positioned, fixed contact structure disposed at the lower part of said casing, a terminal conductor connected to said contact structure and led through the base of said casing, a vertically movable coacting rod contact arranged to be elevated into the upper part of said casing in the open circuit position, and an associated fixed terminal conductor electrically connected to said rod contact led through said casing at a point elevated with respect to said first-named terminal conductor, a metallic casing enclosing said first-named terminal conductor, said circuit breaker casing being in alinement with and mounted on said last-named casing, metal enclosed busbar and cable conductors adapted to be connected to said terminal conductors respectively included in a circuit controlled by said circuit breaker, coacting disconnecting contacts disposed in said metallic casing connected to said first-named terminal conductor and metal enclosed disconnecting contacts connected to the other of said terminal conductors, said disconnecting contacts arranged for connecting and isolating said circuit breaker with respect to said busbar and cable conductors.

3. A high tension, metal clad bus and switch station comprising a single-break oil circuit breaker having a casing mounted in vertical position, fixed contact structure disposed at the lower part of said casing, a terminal conductor connected to said contact structure led through the base of said casing, a vertically movable coacting rod contact having actuating means disposed at the top of said casing and an associated fixed terminal conductor electrically connected to said rod contact led through said casing at a point elevated with respect to said base, a metal enclosure into which said last-named terminal conductor extends for connection to a busbar conductor therein, an isolating switch disposed within said metal enclosure movable to connect and isolate said terminal conductor with respect to said busbar conductor, a casing on which said circuit breaker is mounted forming an insulating chamber into which said first-named terminal conductor extends, a cable terminal extending within said chamber and an isolating and grounding switch disposed within said chamber for grounding said cable terminal or connecting and disconnecting the same with respect to said terminal conductor.

4. A high tension, metal clad bus and switch station of the draw-out type comprising a movable truck unit including a single-break oil circuit breaker having a casing mounted in a vertical position, fixed contact structure disposed at the lower part of said casing, a casing on which said circuit breaker is mounted forming an insulating chamber, a terminal conductor connected to said contact structure extending through the base of said circuit breaker into said insulating chamber, a second terminal conductor connected to said contact structure extending through a side of said circuit breaker casing, a vertically movable coacting rod contact having actuating means disposed at the upper part of said circuit breaker, a third terminal conductor electrically connected to said rod contact and extending through the side of said circuit breaker casing at a point elevated with respect to said first and second terminal conductors, stationary structure forming a metal enclosure for an incoming cable arranged to be connected to said third terminal conductor, and separate metal enclosures for main and auxiliary busbars arranged to be connected to said second and first terminal conductors respectively, and coacting disconnecting contacts for connecting said cable through said circuit breaker to either of said busbars.

5. A high tension, metal clad bus and switch station comprising a single-break oil circuit breaker having a casing mounted in a vertical position, fixed contact structure disposed at the lower part of said casing, a casing on which said circuit breaker casing is mounted forming an oil-filled insulating chamber, a terminal conductor connected to said contact structure extending through the base of said circuit breaker into said insulating chamber, a metal enclosure for a busbar positioned adjacent said insulating chamber, a conductor connected to said busbar and extending within said insulating chamber, an isolating and grounding switch associated with the lower end of said terminal conductor for grounding the same and for connecting and isolating the circuit breaker with respect to said busbar, a vertically movable rod contact coacting with said fixed contact structure having actuating means disposed at the upper part of said circuit breaker, a second terminal conductor electrically connected to said rod contact and led through said circuit breaker at a point elevated with respect to said fixed contact structure, an oil-filled metal casing forming an insulating chamber into which said second terminal conductor extends, a terminal conductor for an incoming cable likewise extending into said chamber, an isolating and grounding switch associated with said cable terminal for grounding the same and for connecting and isolating said circuit breaker with respect thereto, and actuating means for said isolating and grounding switches.

6. A high tension, polyphase metal clad bus and switch station, each phase comprising a single-break oil circuit breaker having a casing mounted in a vertical position, fixed contact structure supported from the base of said casing, a second casing on which said circuit breaker casing is mounted forming an insulating chamber, a terminal conductor connected to said contact structure extending through the base of said circuit breaker into said insulating chamber, a metal enclosed busbar, the phase busbars positioned adjacent the corresponding insulating chambers and in horizontal alinement with each other, a conductor connected to said busbar and extending within said insulating chamber, a disconnecting and grounding switch within said chamber for grounding the aforesaid terminal conductor and for connecting and disconnecting the same with respect to said busbar conductor, a vertically movable rod contact coacting with said fixed contact structure having actuating means disposed at the upper part of said circuit breaker, a second terminal conductor electrically connected to said rod contact and led through a side of said circuit breaker at a point elevated with respect to said fixed contact structure, a metal casing forming an insulating chamber into which said second terminal conductor extends, a terminal conductor for an incoming cable likewise extending into said chamber, a disconnecting and grounding switch within said chamber for grounding said cable terminal and for connecting and disconnecting the same with respect to said second terminal conductor, actuating means for said isolating and grounding switches, and an operating platform disposed above said metal enclosed busbars.

7. A high tension metal clad bus and switch station comprising an oil circuit breaker of the single-break type having a casing mounted in a vertical position, fixed contact structure disposed within and at the lower part of said casing, an oil-filled casing above which said circuit breaker casing is mounted in substantially vertical alinement forming an insulating chamber, a terminal conductor connected to said fixed contact structure extending into said insulating chamber, a vertically movable rod contact coacting with said fixed contact structure having actuating means disposed at the upper part of said circuit breaker, a second terminal conductor electrically connected to said rod contact, an oil-filled casing at the upper part of said breaker casing forming an insulating chamber into which said second terminal conductor extends, a metal enclosed busbar positioned adjacent one of said insulating chambers, a busbar conductor extending within said one insulating chamber, a disconnecting switch associated with the aforesaid terminal and busbar conductors within said chamber, an incoming cable conductor extending into the other of said insulating chambers, and a disconnecting switch associated with said terminal and cable conductors within said last-named chamber.

DAVID REGINALD DAVIES.